United States Patent [19]

Funakawa et al.

[11] Patent Number: 4,684,297
[45] Date of Patent: Aug. 4, 1987

[54] MILLING CUTTER FOR CUTTING THE CONTAMINATED SURFACE OF CONCRETE

[75] Inventors: Naoyoshi Funakawa, Koshigaya; Hajime Demura, Kawaguchi; Nobuyuki Nagamori, Ichikawa, all of Japan

[73] Assignees: Sato Kogyo Co., Ltd., Toyama; Hitachi Carbide Tools Ltd., Narita, both of Japan

[21] Appl. No.: 818,324

[22] Filed: Jan. 13, 1986

[30] Foreign Application Priority Data

May 14, 1985 [JP] Japan .............................. 60-71227[U]

[51] Int. Cl.⁴ ........................... B23C 5/00; B23C 5/20
[52] U.S. Cl. ........................................ 407/41; 407/49; 407/55; 407/58; 407/61; 144/230
[58] Field of Search ........................ 407/41, 49, 51, 55, 407/56, 58, 61; 144/230; 299/88, 89, 91; 125/3, 9, 36, 38

[56] References Cited

U.S. PATENT DOCUMENTS

| 1,514,709 | 11/1924 | Lyon | 407/49 |
| 3,242,553 | 3/1966 | Bogsten | 407/49 |
| 3,742,565 | 7/1973 | Boboltz et al. | 407/49 |
| 4,329,091 | 5/1982 | Erkfritz | 407/41 |
| 4,573,831 | 3/1986 | Lacey | 407/58 |

FOREIGN PATENT DOCUMENTS

| 60-49298 | 3/1985 | Japan . |
| 60-44899 | 3/1985 | Japan . |
| 60-123209 | 8/1985 | Japan . |

Primary Examiner—Nicholas P. Godici
Assistant Examiner—Jerry Kearns
Attorney, Agent, or Firm—Roylance, Abrams, Berdo & Goodman

[57] ABSTRACT

A milling cutter for cutting the contaminated surface of concrete and used at the time of repairing and dismantling nuclear facilities. The milling cutter is characterized in that guide grooves are provided on the outer surface of a body, with their edges slanted from both sides of the body toward the center thereof, and that cutter chips are located along the stepped edge of each of the guide grooves in such a manner that the cutter chips can be easily detached and that those located along the stepped edges of the adjacent grooves are symmetrical in relation to the center line of the body.

12 Claims, 3 Drawing Figures

MILLING CUTTER FOR CUTTING THE CONTAMINATED SURFACE OF CONCRETE

BACKGROUND OF THE INVENTION

1. Field of the Invention

The present invention relates to an improvement of the milling cutter which is used to cut the contaminated surface of concrete at the time of repairing and dismantling nuclear facilities.

2. Prior Art

As the number of nuclear facilities increases, it is necessary to previously study those techniques which will be needed at the sites of large-scaled repairing and dismantling works in the future.

We inventors of the present invention have disclosed from this viewpoint a technique of cutting the contaminated surface of concrete in Japanese Patent Application Nos. 58-153740 and 58-157406. We have also disclosed an improvement of the milling cutter in Japanese Utility Model Application No. 59-10292.

As the milling cutters for use with the contaminated concrete surface cutting apparatus, there have been well known those which comprise embedding ultra-hard chips or diamond chips on the outer circumferential surface of the rotating drum, but the cutting depth to which the contaminated surface of concrete is cut by these cutting apparatuses ranges from 1mm to 3mm and their maximum cutting capacities per hour reach only 5m² or less. These values were not satisfactory to us and it was also impossible to cut aggregates in concrete.

Further when the chips were used up, it took a long time to exchange them with new ones and embed them on the outer circumferential surface of the drum.

SUMMARY OF THE INVENTION

A milling cutter of the present invention for use with the contaminated concrete surface cutting apparatus at the time when nuclear facilities are repaired and dismantled is characterized in that guide grooves are provided on the outer surface of a body, with their edges slanted from both sides of the body toward the center thereof, and that cutter chips are located along the stepped edge of each of the guide grooves in such a manner that the cutter chips can be easily detached and that those located along the stepped edges of the adjacent grooves are symmetrical in relation to the center line of the body.

The object of the present invention is therefore to provide the above-mentioned milling cutter capable of cutting the surface of concrete to 5mm or more, also cutting aggregates in the concrete, and easily exchanging the used-up cutter chips with new ones. This and other objects as well as merits of the present invention will become apparent from the following detailed description with reference to the accompanying drawings.

DETAILED DESCRIPTION OF THE PREFERRED EMBODIMENT

In the Figures, numeral 1 represents a cylindrical body having a diameter of about 120mm and a length of about 110mm. Chips 2 are arranged on the outer surface of the body at a pitch of 15 degrees according to 24-segmentation.

Figure 1:
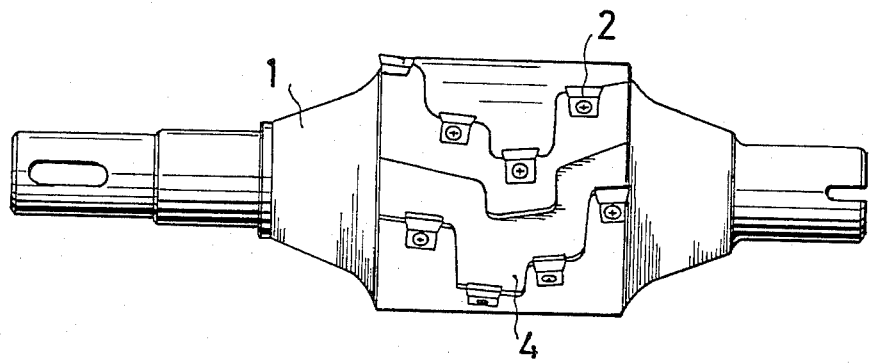
FIG. 1 is a front view showing an embodiment of the present invention.
Figure 2:
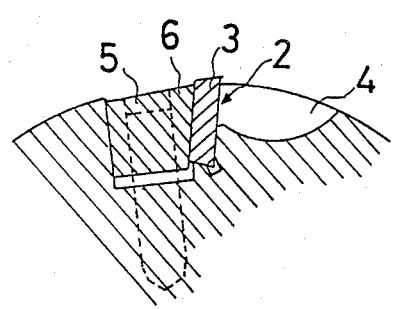
FIG. 2 is a sectional view showing the mechanism of attaching cutter chips.
Figure 3:
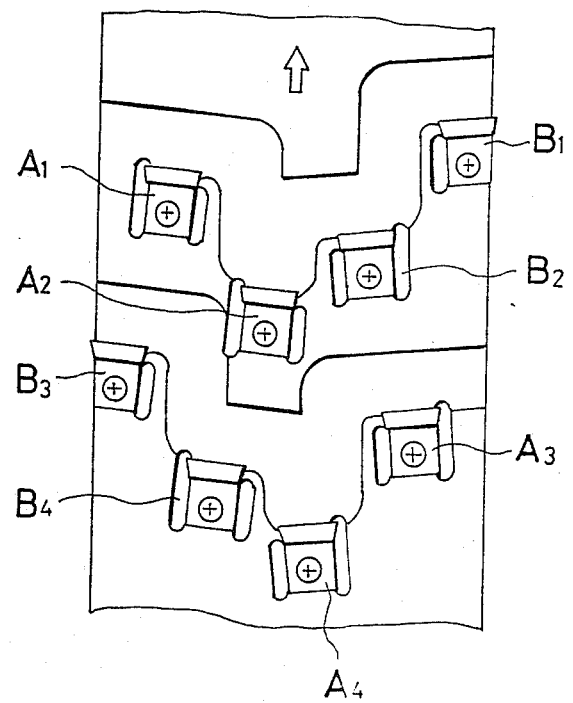
FIG. 3 is a development showing an arrangement of the cutter chips.

As shown in FIGS. 2 and 3, the blade 3 of each of the chips is slanted inward by about 5 degrees to reduce cutting resistance and enable the body 1 to be smoothly rotated. In order to prevent the body 1 from being thrusted, the blade 3 is a little slanted toward the center of the body 1, as shown in FIG. 3. A first group of the chips A1, A2 and B1, B2 is arranged symmetrical to a second group of the chips A3, A4 and B3, B4. Other groups of the chips are continuously arranged below the second group along the circumferential direction of the body 1 at the same location as those of the first and second groups.

The first group may be taken as the chips A1, B1 and A2, B2, while the second group as the chips A3, B3 and A4, B4.

A guide groove 4 is provided in front of the chip 2, slanting toward the center thereof, and it serves to collect dust produced by the cutting operation to its center portion.

The chip 2 can be detached from the surface of the body 1 by turning a screw 5 one round and removing a wedge 6. The chip 2 can be therefore easily exchanged with a new one.

It should be understood that the present invention is not limited to the embodiment shown in the Figures but that the present invention includes the following embodiments:

(1) The arrangement, location and number of the chips 2 and the shape of the guide grooves are not limited to those shown in the Figures, various design modifications can be made to them. For example, the number of the chips A in a group is not limited to two but it may be three or more.

(2) The blade 3 may be formed integral with the wedge 6, or a means for combining both of the blade 3 and wedge 6 may be prepared.

According to the milling cutter of the present invention as described above, the above-mentioned objects can be achieved. Namely, (1) since the chips 2 are slanted toward the center of the body and their cutting operation advances from the outer sides to the center of the body, the thrust of the body can be prevented and the cutting rotation of the body can be smoothly carried out;

(2) as the result, the cutting capacity can be enhanced a sufficiently great extent to cut all of the contaminated surface of concrete, as compared with the conventional milling cutters, and aggregates in concrete can be cut, thereby enabling the cutting capacity per hour to be drastically enhanced; and (3) since the blades 3 are slanted toward the center of the body and the guide groove 4 is provided in front of them, their cutting operation advances from the outer sides to the center portion of the body, so that dust produced can be collected to the center portion of the body, without scattering around, thereby making it easier to collect the dust.

What is claimed is:

1. A milling cutter for cutting contaminated surfaces, particularly radioactive contaminated concrete, comprising:
   an elongated body having an outer surface extending between opposite axial ends of said body;
   a plurality of independently arranged guide grooves on said outer surface, said guide grooves having edges sloped downwardly from said axial ends toward an axial center of said body; and
   a plurality of cutter chips arranged in at least two groups defining preceding and following groups, each of said groups having at least four cutter chips spaced along a generally V-shaped path, the cutter chips in the following group being located in positions corresponding to positions of the cutter chips in the preceding group, each of said cutter chips in the following group bridging a gap in an axial direction of said body between two of the cutter chips in the preceding group.

2. A milling cutter according to claim 1 wherein each of said cutter chips comprises a blade fixed by a wedge to said body.

3. A milling cutter according to claim 1 wherein each of said cutter chips comprises a fixed blade with a cutting edge slanting inwardly.

4. A milling cutter according to claim 1 wherein said guide grooves comprise stepped portions receiving said cutter chips.

5. A milling cutter according to claim 1 where each of said V-shaped paths defined by said groups comprises a low point section at which one of said cutter chips is located, said low point section of said preceding group being offset in an axial direction of said body relative to said low point section of said following group.

6. A milling cutter according to claim 5 wherein a plurality of the preceding and following groups of cutter chips are arranged sequentially about said body.

7. A milling cutter according to claim 5 wherein each of said groups consists of only an even number of cutter chips.

8. A milling cutter according to claim 7 wherein said even number is four.

9. A milling cutter according to claim 1 wherein each of said groups consists of only an even number of cutter chips.

10. A milling cutter according to claim 9 wherein said even number is four.

11. A milling cutter according to claim 1 wherein said guide grooves are formed in and said cutter chips are mounted on a cylindrical portion of said body.

12. A milling cutter according to claim 1 wherein a plurality of the preceding and following groups of cutter chips are arranged sequentially about said body.

* * * * *